US008154772B2

(12) United States Patent
Ushida (10) Patent No.: US 8,154,772 B2
(45) Date of Patent: Apr. 10, 2012

(54) FACSIMILE APPARATUS (75) Inventor: Takehito Ushida, Chiryu (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 679 days.

(21) Appl. No.: 12/338,130

(22) Filed: Dec. 18, 2008

(65) Prior Publication Data

US 2009/0161167 A1 Jun. 25, 2009

(30) Foreign Application Priority Data

Dec. 21, 2007 (JP) ................................. 2007-331146

(51) Int. Cl.
*H04N 1/04* (2006.01)
(52) U.S. Cl. ......... 358/406; 358/449; 358/474; 358/488
(58) Field of Classification Search .................. 358/406, 358/449, 474, 488, 496, 497
See application file for complete search history.

(56) References Cited

FOREIGN PATENT DOCUMENTS

| CN | 1794776 A | | 6/2006 |
|---|---|---|---|
| JP | H3-29562 | | 2/1991 |
| JP | 05030321 A | * | 2/1993 |
| JP | 08204939 A | * | 8/1996 |
| JP | 9-37009 | | 2/1997 |
| JP | 09214729 A | * | 8/1997 |
| JP | H10-117271 | | 5/1998 |
| JP | 11-88582 | | 3/1999 |
| JP | 2005-109727 | | 4/2006 |
| JP | 2007-281958 | | 10/2007 |

OTHER PUBLICATIONS

Japanese Official Action dated Nov. 4, 2009 together with English translation.
Chinese Official Action dated Apr. 14, 2010 together with English translation.

* cited by examiner

*Primary Examiner* — Houshang Safaipour
(74) *Attorney, Agent, or Firm* — Scully, Scott, Murphy & Presser, PC

(57) ABSTRACT

A facsimile apparatus includes a document size detecting unit, a first image data generating unit, a size acquiring unit, a size comparing unit, a second image data generating unit, an image data transmitting unit, and a first transmission result outputting unit. The document size detecting unit detects a first size of a first document. The first image data generating unit generates first image data based on a first image on the first document. The size acquiring unit acquires a second size of a second document that can be received by a reception-side apparatus. The size comparing unit compares the first size with the second size. The second image data generating unit generates second image data for forming a second image on the second document from the first image data based on a comparing result of the size comparing unit. The image data transmitting unit transmits the second image data to the reception-side apparatus. The first transmission result outputting unit outputs exclusively a transmission result indicating a result of transmission of the second image data to the reception-side apparatus.

9 Claims, 8 Drawing Sheets

SAMPLE CONTENT OF
TRANSMISSION REPORT 30

31 — TRANSMISSION REPORT

32 —
- DATE AND TIME 11/2 18:00
- CONTACT NAME A CORPORATION
- DURATION 00:00:30
- PAGE(S) 01
- RESULT OK
- QUALITY STANDARD
- DOCUMENT SIZE B4 **

33 — **: Fax reduced due to capacity of reception-side device.

FIG.6A

MFP 71

74 — FLASH MEMORY
74a — TRANSMISSION DESTINATION REGISTRATION MEMORY AREA
74b — RECEPTION-SIDE RECEIVABLE SIZE MEMORY AREA

FIG.6B

SAMPLE CONTENT OF THE RECEPTION-SIDE RECEIVABLE SIZE MEMORY AREA 74b

| DATE AND TIME | TRANSMISSION DESTINATION | MAXIMUM DOCUMENT SIZE |
|---|---|---|
| 2007/11/1 13:30 | A CORPORATION | A3 |
| 2007/11/2 10:00 | B CORPORATION | A4 |

FIG.6C

SAMPLE CONTENT OF THE RECEPTION-SIDE RECEIVABLE SIZE MEMORY AREA 74b

| DATE AND TIME | TRANSMISSION DESTINATION | MAXIMUM DOCUMENT SIZE |
|---|---|---|
| 2007/11/2 12:00 | C CORPORATION | A4 |
| 2007/11/2 18:00 | A CORPORATION | B4 |
| 2007/11/5 15:30 | B CORPORATION | B4 |

SAMPLE CONTENT OF
TRANSMISSION REPORT 60

31 — TRANSMISSION REPORT

32 —
DATE AND TIME 11/2 18:00
CONTACT NAME A CORPORATION
DURATION 00:00:30
PAGE(S) 01
RESULT OK
QUALITY STANDARD
DOCUMENT SIZE A3→B4 ** (REDUCTION RATIO: 86%)

61 — **: Fax reduced due to capacity of reception-side device.

62 —

FAX TRANSMISSION

December 2, 2007

A Corporation

100 ○○-cho, chiyoda-ku, Tokyo
B Business Corporation
△△ Smith

Dear Sirs:
 Enclosed please find a document as listed below.

63 —

FAX TRANSMISSION

December 2, 2007

A Corporation

100 ○○-cho, chiyoda-ku, Tokyo

B Business Corporation
△△ Smith

Dear Sirs:
 Enclosed please find a document as listed below.

FACSIMILE APPARATUS

CROSS REFERENCE TO RELATED APPLICATION

The present application claims priority from Japanese patent application No. 2007-331146 filed Dec. 21, 2007. The entire contents of the priority applications are incorporated herein by reference.

TECHNICAL FIELD

The present invention relates to a facsimile apparatus.

BACKGROUND

One type of facsimile apparatus well known in the art scans an image from a document, acquires the maximum document size that a reception-side apparatus can receive, and reduces the scanned image to fit within the acquired maximum document size prior to transmitting the image to the reception-side apparatus.

Japanese Patent Application Publication No. H9-37009 describes one such facsimile apparatus. This facsimile apparatus transmits a scanned image at its document size, when a maximum image size that a reception-side apparatus can receive is equivalent to or greater than the image size of the scanned image, and reduces the scanned image prior to transmission when the maximum receivable image size is smaller than the scanned image size. Each time a scanned image is transmitted, the facsimile apparatus also prints out a transmission report including information on the maximum image size that the reception-side apparatus can receive ("A3" size, for example).

SUMMARY

However, since the facsimile apparatus disclosed in Japanese Patent Application Publication No. H9-37009 prints out a transmission report each time a scanned image is transmitted to a reception-side apparatus, regardless of whether the scanned image is transmitted at its original size or reduced prior to transmission, the facsimile apparatus needlessly wastes recording paper.

In view of the foregoing, it is an object of the present invention to provide a facsimile apparatus capable of reducing the needless waste of recording paper by outputting transmission results only when the transmission-side user wishes to confirm the transmission results.

To achieve the above and other objects, one aspect of the invention provides a facsimile apparatus including a document size detecting unit, a first image data generating unit, a size acquiring unit, a size comparing unit, a second image data generating unit, an image data transmitting unit, and a first transmission result outputting unit. The document size detecting unit detects a first size of a first document. The first image data generating unit generates first image data based on a first image on the first document. The size acquiring unit acquires a second size of a second document that can be received by a reception-side apparatus. The size comparing unit compares the first size with the second size. The second image data generating unit generates second image data for forming a second image on the second document from the first image data based on a comparing result of the size comparing unit. The image data transmitting unit transmits the second image data to the reception-side apparatus. The first transmission result outputting unit outputs exclusively a transmission result indicating a result of transmission of the second image data to the reception-side apparatus.

In another aspect of the present invention, there is provided a facsimile apparatus including a document size detecting unit, a first image data generating unit, a size acquiring unit, a first size comparing unit, a second image data generating unit, an image data transmitting unit, a first storing unit, an identification data acquiring unit, a second size comparing unit, and a first transmission result outputting unit. The document size detecting unit detects a first size of a first document. The first image data generating unit generates first image data based on a first image on the first document. The size acquiring unit acquires a second size of a second document that can be received by a reception-side apparatus. The first size comparing unit compares the first size with the second size. The second image data generating unit generates second image data for forming a second image on the second document from the first image data based on a comparing result of the first size comparing unit. The image data transmitting unit transmits the second image data to the reception-side apparatus. The first storing unit stores identification data identifying the reception-side apparatus, and a third size of a third document that can be received by the reception-side apparatus. The third size is stored when previously transmitting an image data to the reception-side apparatus. The identification data is in association with the third size. The identification data acquiring unit acquires the identification data of the reception-side apparatus. The second size comparing unit compares the second size with the third size that is in association with the identification data acquired by the identification data acquiring unit and stored in the third storing unit. The first transmission result outputting unit outputs a transmission result indicating a result of transmission of the second image data to the reception-side apparatus only when the second comparing unit determines that the third size is different from the second size and the second image data is transmitted to the reception-side apparatus.

DETAILED DESCRIPTION

Figure 1:
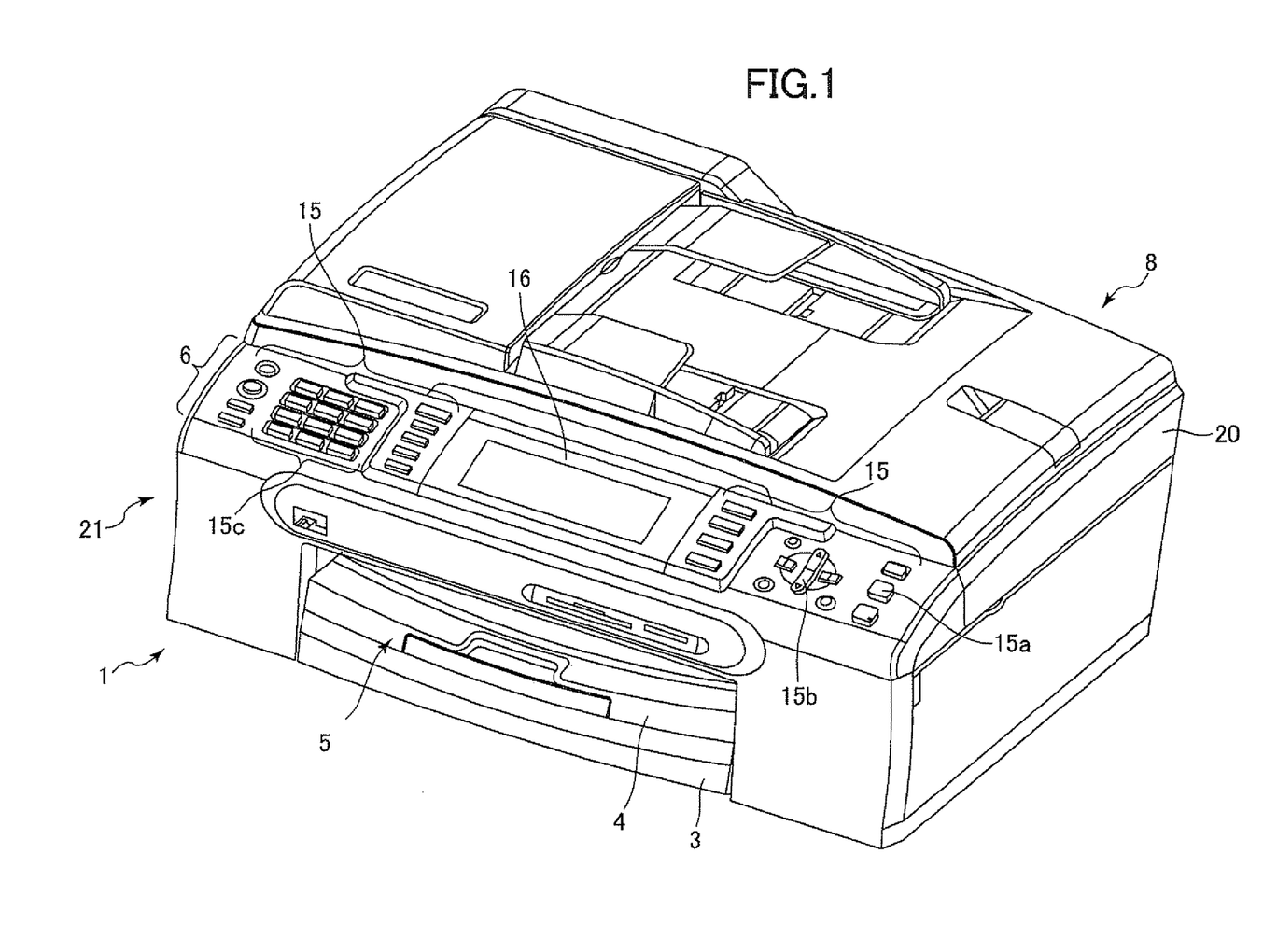
FIG. 1 is a perspective view showing the external appearance of a multifunction peripheral having a facsimile apparatus according to a first embodiment of the present invention.

Next, embodiments of the present invention will be described while referring to the accompanying drawings. FIG. 1 is a perspective view showing the external appearance of a multifunction peripheral (MFP) 1 having a facsimile apparatus according to a first embodiment of the present invention.

Figure 2:
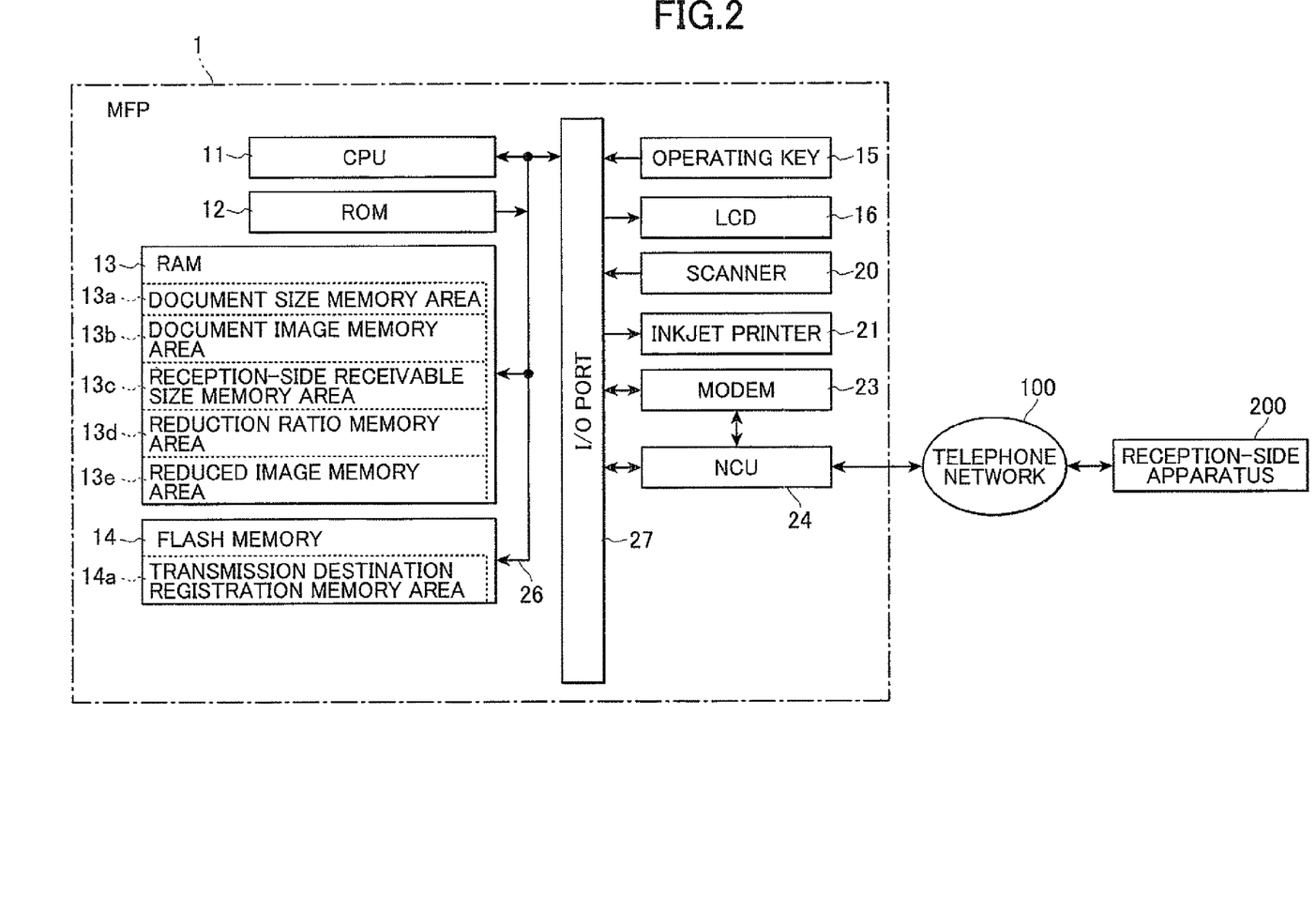
FIG. 2 is a block diagram showing the electrical structure of the multifunction peripheral according to the first embodiment.

The MFP 1 has a facsimile transmission function for transmitting a scanned image to a reception-side apparatus 200 (see FIG. 2) connected to the MFP 1 via a telephone network 100 (see FIG. 2). When the maximum document size that the reception-side apparatus 200 can receive (the size of paper used in the reception-side apparatus 200) is smaller than the document size of the scanned original document that the MFP 1 is transmitting to the reception-side apparatus 200, the MFP 1 first reduces the a size of the scanned image being transmitted to another size that the reception-side apparatus 200 can receive before transmitting the scanned image.

The MFP 1 also has a function for recording (printing) a transmission report 30 (see FIG. 5) on recording paper to notify the user of the transmission results. As a feature of this embodiment, the MFP 1 according to the first embodiment records this transmission report 30 only when the scanned image was reduced in a size before being transmitting to the reception-side apparatus 200. In addition to the facsimile transmission function, the MFP 1 has a printer function, scanner function, copier function, and the like.

As shown in FIG. 1, the MFP 1 includes an inkjet printer 21 for recording images on recording paper conveyed to a prescribed transfer position (not shown) based on image data, and a scanner 20 disposed above the inkjet printer 21 for scanning an original document when implementing the facsimile function, scanner function, or copier function.

The inkjet printer 21 has an opening 5 formed in the front surface of the main body of the MFP 1. The opening 5 is partitioned vertically into an upper section and a lower section. A paper cassette 3 capable of accommodating a plurality of stacked sheets of recording paper is inserted into the lower section of the opening 5. The paper cassette 3 is capable of accommodating cut sheets of recording paper up to A3 size, for example. The upper section of the opening 5 serves as a discharge section 4 into which sheets of recording paper are discharged after a recording operation.

While not shown in the drawings, the inkjet printer 21 also includes a paper-conveying motor for conveying the recording paper, a print head for ejecting ink onto the recording paper, a carriage for supporting the print head, and a carriage motor for moving the carriage.

The scanner 20 disposed above the inkjet printer 21 is capable of scanning original documents of the A3 size or smaller. The scanner 20 includes a glass plate (not shown) for supporting an original document, a document cover 8 capable of being rotated open and closed over the glass plate, and a sensor (not shown) such as a compact image sensor (CIS) or a charge coupled device (CCD) disposed beneath the glass plate for scanning the original document positioned on the glass plate.

A rectangular control panel 6 elongated laterally is provided on the front side of the document cover 8. The control panel 6 includes operating keys 15 and a liquid crystal display (LCD) 16. The operating keys 15 include a fax transmission key 15a for issuing an instruction to transmit a fax to a specified transmission destination, a destination selection key 15b for selecting a transmission destination from among a plurality of prerecorded transmission destinations, and number keys 15c for inputting the fax number of a transmission destination. By pressing the operating keys 15, the operator can perform various operations, such as turning the power on and off and switching the active function.

The LCD 16 serves to display menus, operation procedures, and the status of operations being executed. Since data corresponding to the operating keys 15 is displayed on the LCD 16, the operator can confirm the fax number for the transmission destination, the number of pages being transmitted to the destination, and various other data.

In order to scan an original document and transmit the scanned image as a fax, the operator rotates the document cover 8 upward, places the original document on the glass plate, and closes the document cover 8 to hold the original in place. Next, the operator presses the fax transmission key 15a to initiate the fax transmission. At this time, the sensor of the scanner 20 scans an image of the original document positioned on the glass plate.

When scanning an image of an original document with the scanner 20, the MFP 1 first acquires the size of the original document and subsequently generates an image based on this size. To do this, the sensor performs a quick low-quality pre-scan of the entire scannable region of the glass plate. The pre-scanned image includes an image of the original document and an image of the document cover 8 resting on top of the original document. From this data, the MFP 1 can detect the border between the original document and the document cover 8 and can determine the size of the original document based on the shape and size of the region recognized as a document image. The MFP 1 stores the size of the original document in an area of memory. Next, the sensor of the scanner 20 rescans the original document at the desired resolution (resolution for facsimile transmissions, for example) and stores a scanned image data in a separate area of memory.

Next, the electrical structure of the MFP 1 will be described with reference to FIG. 2. FIG. 2 is a block diagram illustrating this electrical structure. The MFP 1 primarily includes a CPU 11, a ROM 22, a RAM 13, a flash memory 14, the operating keys 15, the LCD 16, the scanner 20, the inkjet printer 21, a modem 23, and a network configuration utility (NCU) 24.

The CPU 11, ROM 12, RAM 13, and flash memory 14 are interconnected via a bus line 26. Further, the operating keys 15, LCD 16, scanner 20, inkjet printer 21, modem 23, NCU 24, and bus line 26 are interconnected via an I/O port 27.

The CPU 11 controls the components connected to the I/O port 27 and the functions implemented on the MFP 1 based on fixed values and programs stored in the ROM 12, RAM 13, and flash memory 14.

The ROM 12 is a rewritable memory for storing control programs and the like executed on the MFP 1. The ROM 12 stores a program for implementing the main process shown in the flowchart of FIG. 4.

The RAM 13 is a rewritable volatile memory for temporarily storing various data used when the CPU 11 executes processes on the MFP 1. The RAM 3 is provided with a document size memory area 13a, a document image memory area 13b, a reception-side receivable size memory area 13c, a reduction ratio memory area 13d, and a reduced image memory area 13e.

The document size memory area 13a stores the document size of an original document scanned by the scanner 20. For example, the document size is stored in the form "A3" to indicate the dimensions of the original document when the original document is of the A3 size. The document image memory area 13b stores image data based on an image on an original document scanned by the scanner 20.

The reception-side receivable size memory area 13c stores the size of a document for a facsimile transmission that can be received by the reception-side apparatus 200. Although this will be described in greater detail with reference to FIG. 3, the reception-side apparatus 200 transmits a DIS signal to the MFP 1 that includes data indicating the maximum receivable document size (hereinafter refer to as maximum document size) that can be received by the reception-side apparatus 200. When the MFP 1 receives the DIS signal from the reception-side apparatus 200, the MFP 1 stores this maximum document size in the reception-side receivable size memory area 13c in the form "A4", for example.

The reduction ratio memory area 13d stores a reduction ratio used for reducing the document size of the image defined by image data stored in the document image memory area 13b to the maximum document size that can be received by the reception-side apparatus 200. The reduction ratio is calculated from the maximum document size stored in the reception-side receivable size memory area 13c and the document size stored in the document size memory area 13a. For example, if the document size of image data being transmitted to the reception-side apparatus 200 is "A3" and the maximum document size that the reception-side apparatus 200 can receive is "A4", a reduction ratio of "70%" is stored in the reduction ratio memory area 13d.

The reduced image memory area 13e stores image data for a reduced image generated by reducing the size of the image corresponding to image data stored in the document image memory area 13b based on the reduction ratio stored in the reduction ratio memory area 13d.

The flash memory 14 is a rewritable nonvolatile memory capable of preserving data even when the power to the MFP 1 is turned off. The flash memory 14 is provided with a transmission destination registration memory area 14a.

The transmission destination registration memory area 14a functions to store information for transmission destinations, such as fax numbers and names. When the transmission destination registration memory area 14a stores the fax numbers, names, and the like of transmission destinations, the user can select a destination for transmitting a fax by operating the destination selection key 15b described above.

The modem 23 functions to modulate image data being transmitted with the facsimile function to signals that can be transferred over the telephone network 100 and to transmit these signals via the NCU 24, and to receive signals inputted from the telephone network 100 via the NCU 24 and demodulate the signals into image data that can be displayed on the LCD 16 or recorded on recording paper with the inkjet printer 21. The NCU 24 is connected to the telephone network 100 and controls the transmission of dialing signals to the telephone network 100, a response to calling signals from the telephone network 100, and the like.

Next, the various signals exchanged between the MFP 1 (transmission-side apparatus) and the reception-side apparatus 200 during a facsimile transmission will be described with reference to FIG. 3.

Figure 3:
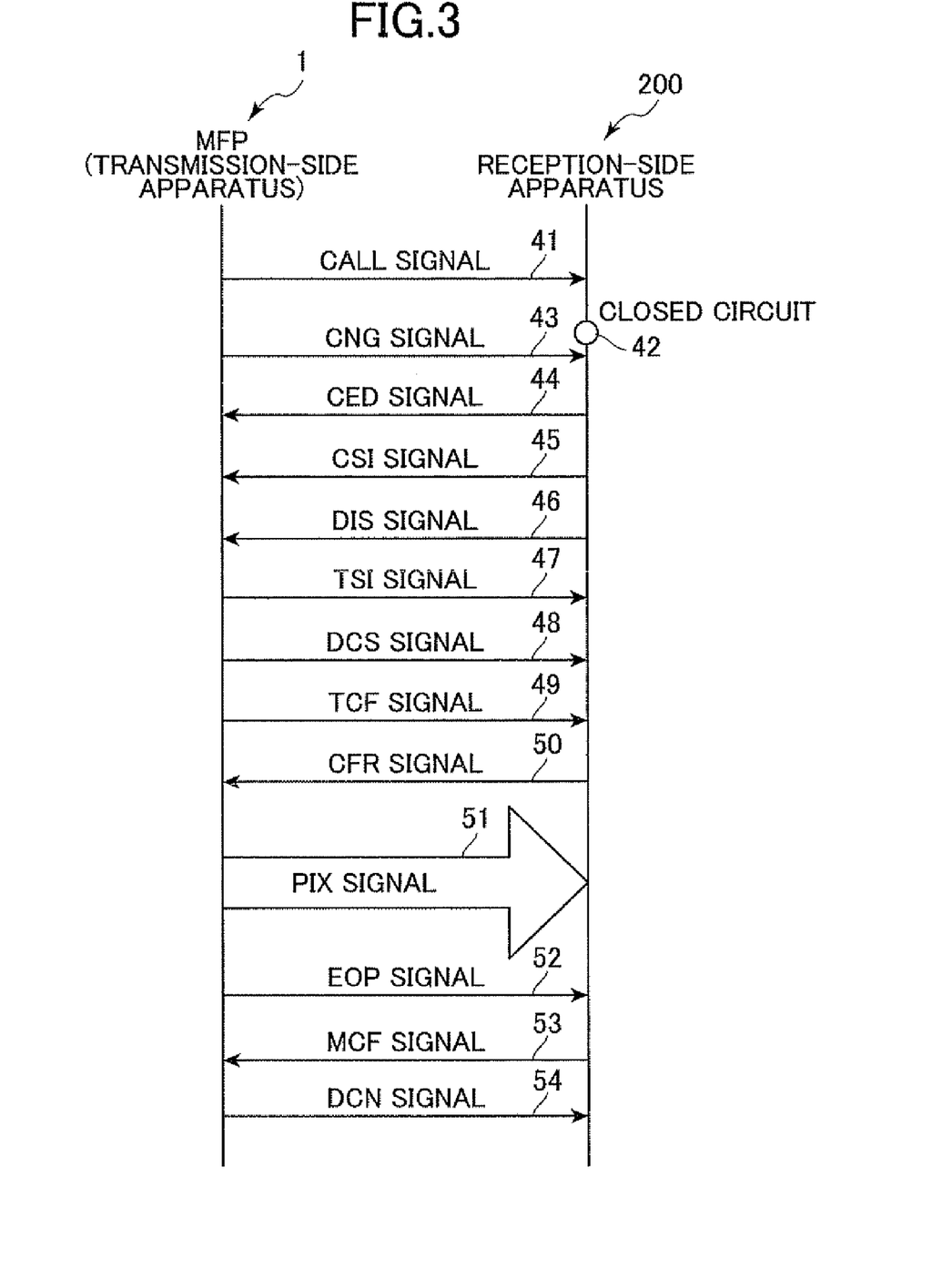
FIG. 3 is an explanatory diagram conceptually illustrating a transmission control procedure performed between the multifunction peripheral (transmission-side apparatus) and a reception-side apparatus.

FIG. 3 is an explanatory diagram conceptually illustrating communication control procedures performed between the MFP 1 and the reception-side apparatus 200. When calling the reception-side apparatus 200, the MFP 1 transmits a call signal 41 to the reception-side apparatus 200 via a telephone exchange. When the reception-side apparatus 200 receives the call signal 41 and establishes a closed circuit 42 with the telephone line, the MFP 1 transmits a CNG signal (calling tone) 43 indicating a non-voice terminal to the reception-side apparatus 200.

After receiving the CNG signal 43, the reception-side apparatus 200 transmits a CED (called station identification) signal 44, a CSI (channel state information) signal 45, and a DIS (digital identification signal) signal 46 to the MFP 1. The CSI signal 45 is a signal identifying the reception-side terminal, i.e., a signal indicating the fax number of the reception-side apparatus 200. The DIS signal 46 notifies the MFP 1 of the transmission/reception functions possessed by the reception-side apparatus 200, such as the maximum document size, resolution, encoding methods, transfer rate, and the like.

Upon receiving the DIS signal 46, the MFP 1 acquires the maximum document size that the reception-side apparatus 200 can receive and stores this size in the reception-side receivable size memory area 13c of the RAM 13. Subsequently, the MFP 1 transmits a TSI (transmission subscriber identification) signal 47 and a DCS (digital command signal) signal 48 to the reception-side apparatus 200.

The TSI signal 47 is a calling terminal identification signal, i.e., a signal representing the fax number of the MFP 1. The DCS signal 48 is a signal notifying the reception-side apparatus 200 of transmission parameters set based on the transmission/reception functions of the reception-side apparatus 200, such as the size and resolution of the document being transmitted, the encoding method, and the transfer rate.

Here, when the maximum document size stored in the reception-side receivable size memory area 13c is smaller than the document size stored in the document size memory area 13a, the MFP 1 reduces the document size of the image data to a size conforming to the maximum document size on the reception-side apparatus 200 and notifies the reception-side apparatus 200 of the reduced size of the document being transmitted through the DCS signal 48. If the maximum document size stored in the reception-side receivable size memory area 13c is the same or greater than the document size stored in the document size memory area 13a, the MFP 1 notifies the reception-side apparatus 200 that the document will be transmitted at the document size.

After transmitting the DCS signal 48, the MFP 1 transmits a TCF (training check) signal 49 to the reception-side apparatus 200. The TCF signal 49 is a signal for confirming that the reception-side apparatus 200 can receive data normally. If the reception-side apparatus 200 can receive the TCF signal 49 normally, the reception-side apparatus 200 transmits a CFR (confirmation to receive) signal 50 to notify the MFP 1 that the reception-side apparatus 200 is prepared to receive the image data and that the MFP 1 may begin transmitting the image data.

Upon receiving the CFR signal 50, the MFP 1 transmits a PIX (image) signal 51 and an EOP (end-of-packet) signal 52 to the reception-side apparatus 200. The PIX signal 51 is a signal for transmitting image data to the reception-side apparatus 200. When the maximum document size stored in the reception-side receivable size memory area 13c is smaller than the document size stored in the document size memory area 13a, the image data stored in the reduced image memory area 13e is transmitted through the PIX signal 51.

However, if the maximum document size stored in the reception-side receivable size memory area 13c is the same as or greater than the document size stored in the document size memory area 13a, the image data stored in the document image memory area 13b is transmitted through the PIX signal 51. The EOP signal 52 functions to notify the reception-side apparatus 200 that the transmission of image data through the PIX signal 51 is complete and to confirm that the reception-side apparatus 200 receives the image data normally.

Upon receiving the EOP signal 52, the reception-side apparatus 200 transmits an MCF (message confirmation) signal 53 to the MFP 1 if the image data transmitted through the PIX signal 51 was received normally. The MCF signal 53 notifies the MFP 1 that the image data transmitted through the PIX signal 51 was received normally. After receiving the MCF signal 53, the MFP 1 transmits a DCN (disconnect) signal 54 to the reception-side apparatus 200 instructing that the closed telephone circuit be opened and subsequently disconnects the telephone line.

This completes the description of signals exchanged between the MFP 1 and reception-side apparatus 200 during facsimile communications.

Next, a fax transmission process executed by the CPU 11 of the MFP 1 will be described with reference to FIG. 4.

Figure 4:
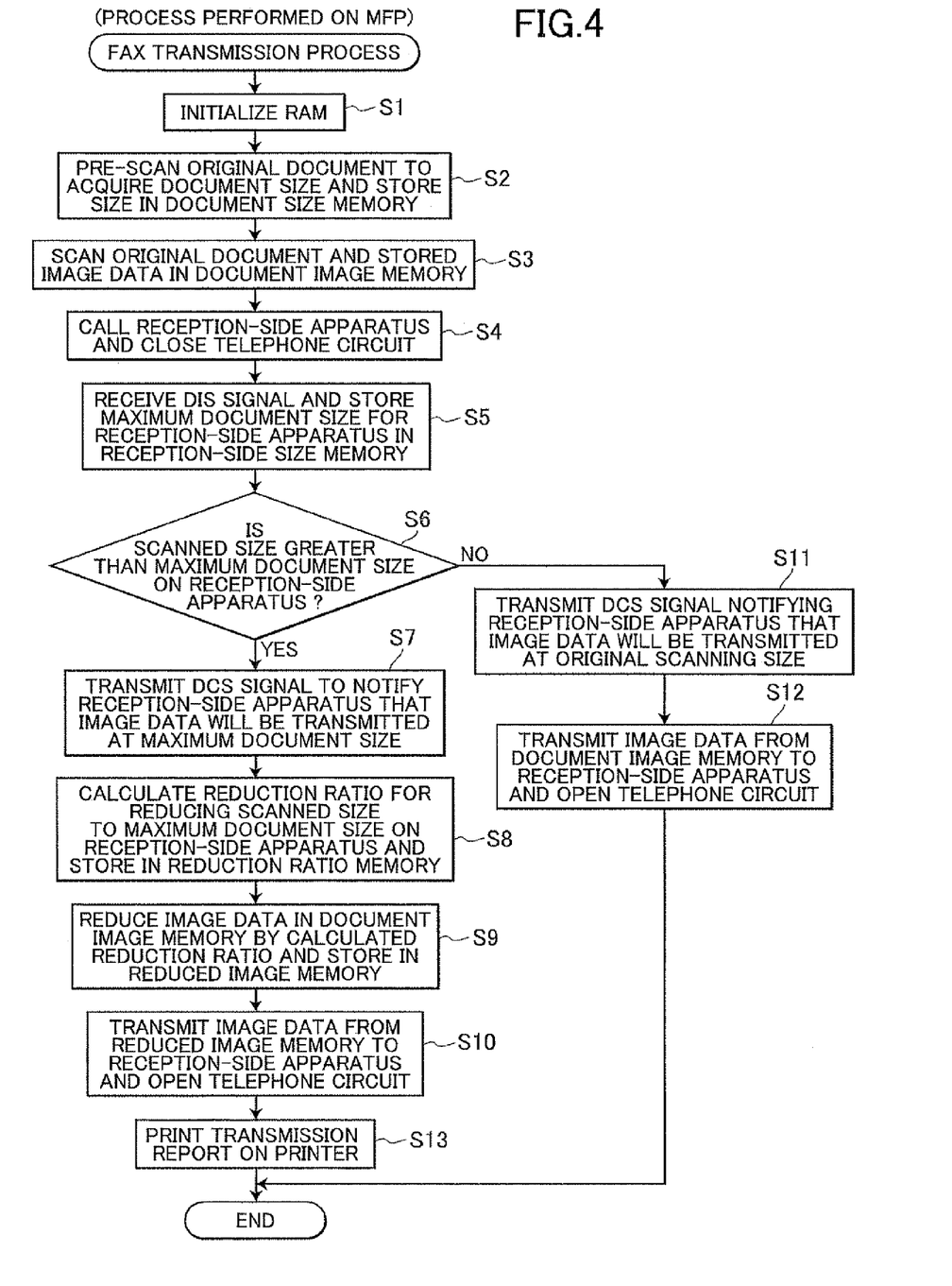
FIG. 4 is a flowchart illustrating steps in a fax transmission process performed on the multifunction peripheral according to the first embodiment.

FIG. 4 is a flowchart illustrating steps in the fax transmission process performed on the MFP 1. The fax transmission process is performed to transmit an image scanned from an original document to the reception-side apparatus 200. In this process, the MFP 1 records the transmission report 30 (see FIG. 5) indicating results of the transmission on recording paper using the inkjet printer 21 only when the image transmitted to the reception-side apparatus 200 was reduced prior to transmission. The CPU 11 of the MFP 1 executes this fax transmission process when the user of the MFP 1 presses the fax transmission key 15a after selecting a transmission destination with the destination selection key 15b or after inputting a fax number on the number keys 15c to specify the transmission destination.

In S1 of the fax transmission process, the CPU 11 initializes the memory areas 13a-13e in the RAM 13. In S2 the CPU 11 controls the scanner 20 to pre-scan an image of an original document to be transmitted to the reception-side apparatus 200, acquires a document size of the original document, and stores this document size in the document size memory area 13a. In S3 the CPU 11 controls the scanner 20 to rescan the image of the original document and stores the scanned image data in the document image memory area 13b.

In S4 the MFP 1 calls the reception-side apparatus 200 via the telephone network 100 and closes the telephone circuit. As described in FIG. 3, the MFP 1 transmits the CNG signal 43 to the reception-side apparatus 200 at this time. Upon receiving the CNG signal 43, the reception-side apparatus 200 transmits the CED signal 44, CSI signal 45, and DIS signal 46 to the MFP 1. After receiving the DIS signal 46 from the reception-side apparatus 200, in S5 the MFP 1 acquires the maximum document size that the reception-side apparatus 200 can receive, from the various data included in the DIS signal 46 and stores this maximum document size in the reception-side receivable size memory area 13c.

In S6 the CPU 11 determines whether the document size of the original document scanned by the scanner 20 is greater than the maximum document size that can be received by the reception-side apparatus 200. In other words, the MFP 1 determines whether the document size stored in the document size memory area 13a exceeds the maximum document size stored in the reception-side receivable size memory area 13c.

For example, if the original document scanned by the scanner 20 has an A3 size and the maximum document size of a document that the reception-side apparatus 200 can receive is A4 sizes the MFP 1 stores the size "A3" in the document size memory area 13a and the size "A4" in the reception-side receivable size memory area 13c. Subsequently, in S6 the MFP 1 compares the A3 size stored in the document size memory area 13a to the A4 size stored in the reception-side receivable size memory area 13c and determines that the A3 size exceeds the A4 size.

If the document size stored in the document size memory area 13a is the same as or smaller than the maximum document size stored in the reception-side receivable size memory area 13c (S6: NO), in S1 the MFP 1 transmits the DCS signal 48 to the reception-side apparatus 200, notifying the reception-side apparatus 200 that the image data will be transmitted at the original document size stored in the document size memory area 13a (the size of the original document scanned by the scanner 20).

In S12 the CPU 11 transmits the image data stored in the document image memory area 13b to the reception-side apparatus 200 and opens the telephone circuit after transmission is completed. Subsequently, the CPU 11 ends the fax transmission process.

However, if the document size stored in the document size memory area 13a exceeds the maximum document size stored in the reception-side receivable size memory area 13c (S6: YES), in S7 the CPU 11 transmits the DCS signal 48 to the reception-side apparatus 200, notifying the reception-side apparatus 200 that the image data will be transmitted at the maximum document size stored in the reception-side receivable size memory area 13c. In other words, the CPU 11 indicates that the original document size of image data scanned by the scanner 20 will be reduced to conform to the maximum document size on the reception-side apparatus 200 prior to transmitting the image data to the reception-side apparatus 200.

In S8 the CPU 11 calculates a reduction ratio for reducing the document size of the scanned document to the maximum document size that can be received by the reception-side apparatus 200 so that the document size of the scanned document conforms to the maximum document size that the reception-side apparatus 200 can receive, and stores this reduction ratio in the reduction ratio memory area 13d.

As an example, if the document size "A3" is stored in the document size memory area 13a and the receivable size "B4" is stored in the reception-side receivable size memory area 13c, the CPU 11 calculates a reduction ratio capable of reducing data for the A3-size document to 86% its original size so that text and images in the A3-size page can fit on a B4-size sheet. Similarly, the CPU 11 can calculate reduction ratios for paper sizes of various dimensions.

In S9 the CPU 11 reduces the image represented by image data stored in the document image memory area 13b by the reduction ratio stored in the reduction ratio memory area 13d and stores the resulting image data in the reduced image memory area 13e. In S10 the CPU 11 transmits the reduced image data stored in the reduced image memory area 13e to the reception-side apparatus 200 and opens the telephone circuit after transmission is completed. In S13 the CPU 11 controls the inkjet printer 21 to record the transmission report 30 on recording paper, and subsequently ends the fax transmission process.

Through the fax transmission process described in FIG. 4, the CPU 11 can control the inkjet printer 21 to record the transmission report 30 on recording paper indicating the transmission results only when the image (the image data) transmitted to the reception-side apparatus 200 was reduced. Since the transmission report 30 is recorded on paper only when the transmission-side user would wish to confirm the transmission results, less recording paper and ink are wasted unnecessarily in recording operations than in the conventional method of recording the transmission report 30 on recording paper each time an image is transmitted to the reception-side apparatus 200.

Further, this process ensures that the transmission-side user is notified by recording the transmission report 30 on recording paper only when there is a possibility that the transmitted image (image data) was compressed beyond readability or otherwise ruined. The present invention does not require the transmission-side user to confirm transmission results when such confirmation is unnecessary (when the image transmitted to the reception-side apparatus 200 was not reduced), thereby reducing the time and effort spent by the transmission-side user.

Next, the transmission report 30 will be described with reference to FIG. 5. The inkjet printer 21 records the transmission report 30 on recording paper when an original document image is reduced prior to transmission to the reception-side apparatus 200.

Figure 5:
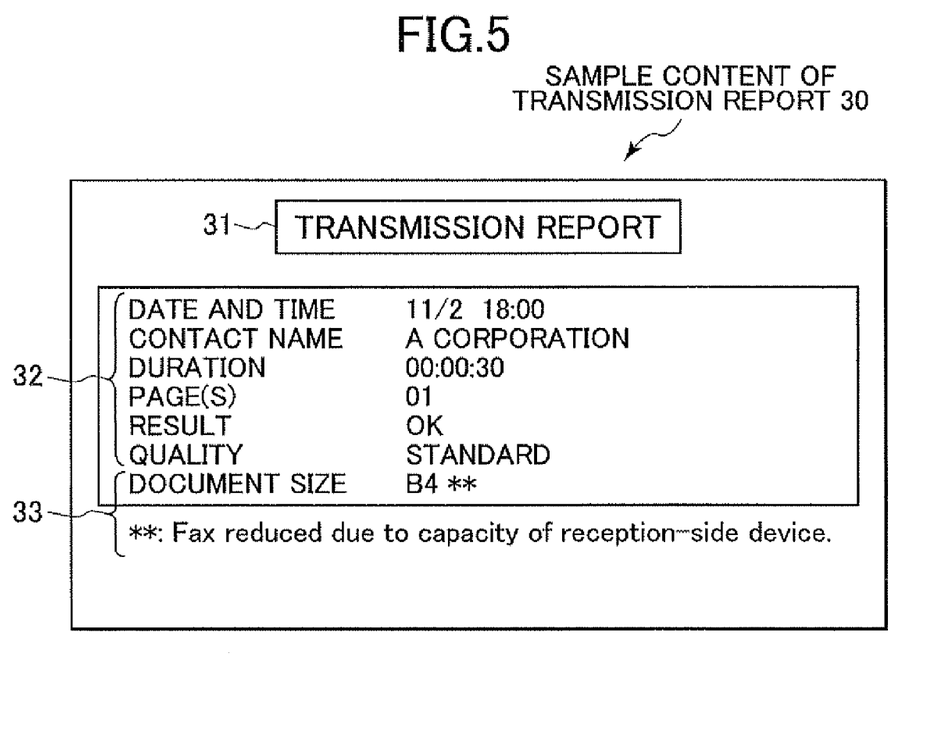
FIG. 5 is an explanatory diagram showing sample content in a transmission report according to the first embodiment.

FIG. 5 is an explanatory diagram showing sample content of the transmission report 30 recorded on recording paper. In order from top to bottom in FIG. 5, the transmission report 30 includes a title 31, transmission results information 32, and reduction results information 33. The title 31, transmission report 32, and the reduction results information 33 correspond to a transmission result.

The title 31 is the heading of the transmission report 30, such as "Transmission Report." The transmission results information 32 indicates results for transmitting a reduced image, such as the date and time, contact name, duration, page(s), result, and quality.

The date and time are the date and time at which the MFP 1 initiated transmission of the reduced image (reduced image data) to the reception-side apparatus 200 and is given in the format "11/2 18:00," for example. The contact name is the name of the contact on the reception side to which the reduced image was transmitted and, more specifically, is the name selected with the destination selection key 15b or the fax number inputted with the number keys 15c. For example, the contact name "A Company" is recorded when the user selects A Company as the transmission destination with the destination selection key 15b.

The duration is the amount of time that the MFP 1 communicates with the reception-side apparatus 200 from the time that the telephone circuit is closed to the time that the circuit is opened. If the duration is 30 seconds, for example, "00:00:30" is recorded as the duration. Page(s) indicates the number of pages in the document transmitted to the reception-side apparatus 200. "01" is recorded as the page(s) if the transmitted document included only one page, for example.

The result indicates the result of communications with the reception-side apparatus 200. For example, if the reduced image data was transmitted to the reception-side apparatus 200 normally, "OK" is recorded as the result. If the reception-side apparatus 200 was busy or if image data was otherwise not transmitted normally, "Error" is recorded as the result.

The quality indicates the image quality of the reduced image data transmitted to the reception-side apparatus 200. The user can select from "Standard" and "Fine" as the transmission quality for image data, but the quality is set to "Standard" as the default. Therefore, "Standard" is normally recorded as the transmission quality.

The reduction, results information 33 indicates the results of reducing the image (image data) prior to transmission. The reduction results information 33 includes the page size of the reduced image data transmitted to the reception-side apparatus 200, and supplemental information to the results of reducing and transmitting the data.

For example, when the document size of the original document scanned by the scanner 20 is the "A3" size and the reception-side apparatus 200 can receive a maximum page (document) size of "B4", the image data transmitted to the reception-side apparatus 200 must first be reduced to a size receivable by the reception-side apparatus 200. In this case, the image data is reduced from the A3 size to the B4 size.

In this example, the reduction results information 33 in the transmission report 30 includes the data "Document size: B4" and ": Fax reduced due to capacity of reception-side device."

As a variation on the page size in the reduction results information 33 indicating the size of the image transmitted to the reception-side apparatus 200, the reduction results information 33 may include the reduction ratio at which the document size of the image data scanned by the scanner 20 was reduced to match the receivable size on the reception-side apparatus 200. Alternatively, the reduction results information 33 may include both the reduction ratio and the page size of the image data transmitted to the reception-side apparatus 200.

Since the reduction results information 33 of the transmission report 30 indicates the page size corresponding to the image data transmitted to the reception-side apparatus 200, as described above, the transmission-side user can easily recognize how much the original image was reduced before being transmitted to the reception-side apparatus 200. Accordingly, if the reduced size of the image transmitted to the reception-side apparatus 200 is inappropriate, the transmission-side user can take steps to modify the image size on the original or the size of the original itself to an appropriate size and to retransmit the image.

Further, by recording a single transmission report 30 on a single sheet of recording paper, the transmission-side user can confirm the results in the transmission report 30 at a glance, unlike when the transmission report 30 is recorded on a plurality of sheets of recording paper or when a plurality of transmission reports 30 is recorded on a single sheet of recording paper.

Next, an MFP 71 having a facsimile apparatus according to a second embodiment of the present invention will be described with reference to FIGS. 6 through 8.

While the MFP 1 according to the first embodiment records the transmission report 30 on recording paper only when the document image transmitted to the reception-side apparatus 200 was reduced, the MFP 71 according to the second embodiment records a transmission report 60 (see FIG. 8) on recording paper only when the document image transmitted to the reception-side apparatus 200 was reduced and when the maximum document size acquired from the reception-side apparatus 200 is less than a maximum document size at the time of previously transmitting a document image to the reception-side apparatus 200

Here, the electrical structure of a MFP 71 according to the second embodiment will be described with reference to FIG. 6A.

Figure 6A:
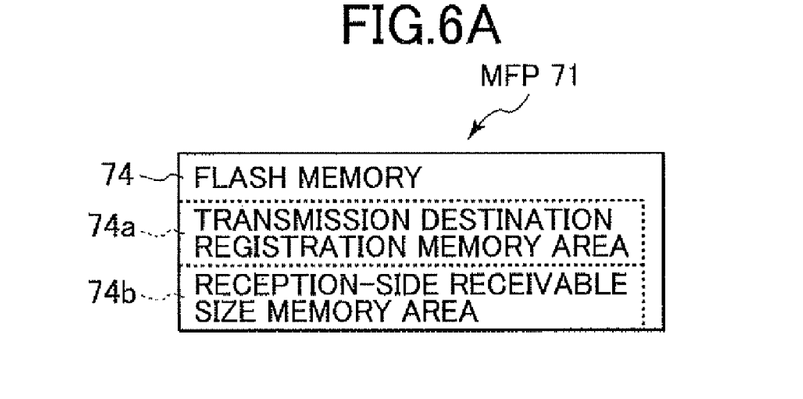
FIG. 6A is a block diagram showing a flash memory of a multifunction peripheral having a facsimile apparatus according to a second embodiment of the present invention.

FIG. 6A is a block diagram showing the electrical structure of a flash memory 74 provided in the MFP 71. Since the flash memory 74 of the MFP 71 shown in FIG. 6A is the only part of the MFP 71 that differs from the block diagram of the MFP 1 according to the first embodiment (see FIG. 2), only the flash memory 74 will be described below.

The flash memory 74 includes a transmission destination registration memory area 74a, and a reception-side receivable size memory area 74b. The purpose of the transmission destination registration memory area 74a is identical to that of the transmission destination registration memory area 14a described in the first embodiment and will not be repeated here.

The reception-side receivable size memory area 74b stores the maximum document size corresponding to each transmission destination, when a DIS signal including the maximum document size was received from the transmission destination.

Specifically, the reception-side receivable size memory area 74b associatively stores the transmission date and time, the destination that received the image, and the maximum document size included in the DIS signal received from the reception-side apparatus 200 corresponding to each transmission when each transmission is completed.

When the reception-side receivable size memory area 74b already stores a transmission date and time, transmission destination, and receivable document size from a previous transmission, this existing data is replaced with a new transmission date and time, transmission destination, and receivable document size when performing a new transmission to the same transmission destination.

The MFP 71 may also be configured to allow the user to input through operations on the operating keys 15 transmission destinations and the maximum document size at each transmission destination to be stored in the reception-side receivable size memory area 74b. In this case, the inputted data is stored associatively in the reception-side receivable size memory area 74b, with the date and time at which the user inputted the data serving as the transmission date and time.

Next, sample content of the reception-side receivable size memory area 74b in the flash memory 74 will be described with reference to FIGS. 6B and 6C. FIGS. 6B and 6C are explanatory diagrams showing sample content of the reception-side receivable size memory area 74b.

Figure 6B:
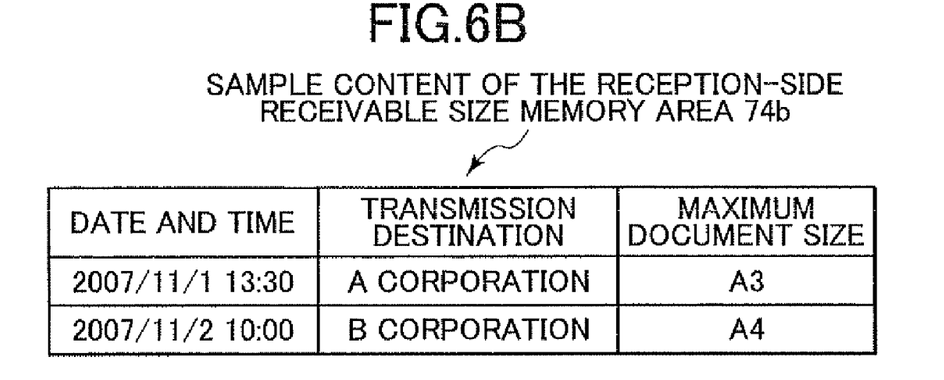
FIGS. 6B and 6C are explanatory diagrams showing sample content of a reception-side receivable size memory area.

As shown in FIG. 6B, the reception-side receivable size memory area 74b associatively stores transmission dates and times, transmission destinations, and receivable page sizes.

The transmission date and time is the date and time at which the MFP 71 initiated transmission of the image data (the image) to the reception-aide apparatus 200. The transmission destination is the name of the contact at the destination to which the image data was transmitted. If the user selected the transmission destination with the destination selection key 15b, the name of the selected destination is stored in the reception-side receivable size memory area 74b. If the user specified the transmission destination by inputting the fax number for the contact via the number keys 15c, the inputted fax number is stored as the transmission destination.

The maximum document size is the maximum receivable document size specified in the DIS signal received from the reception-side apparatus 200. For example, if the maximum document size that the reception-side apparatus 200 can receive is the A3 size and the MFP 71 transmits an image data of a B4-size original document to A Company on Nov. 1, 2007 at 13:30, the MFP 71 associatively stores the data "11/1/2007 13:30" as the transmission date and time, "A Company" as the transmission destination, and "A3" as the maximum document size in the reception-side receivable size memory area 74b.

Figure 6C:
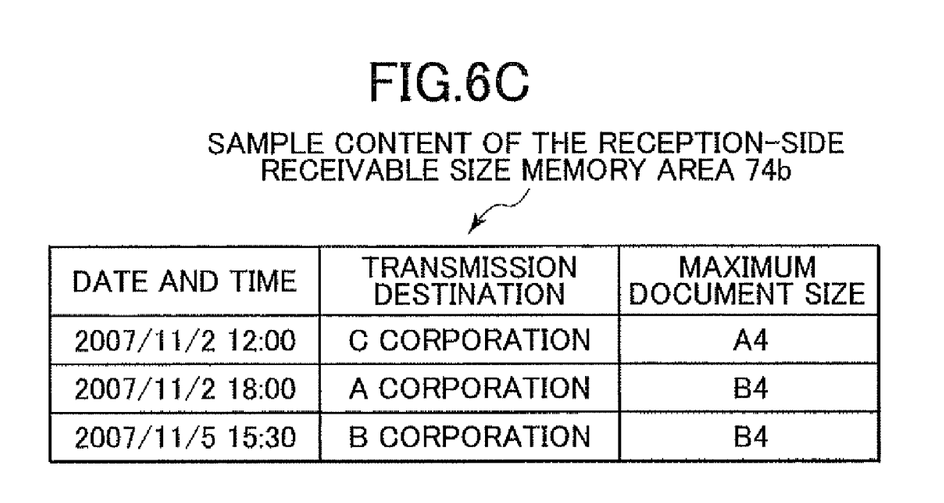

At this time, if an image data for an A4-size original document is transmitted to a new destination "C Company" on Nov. 2, 2007 at 12:00, and the reception-side apparatus 200 at the destination (C Company) can receive a maximum document size of A4, then the MFP 71 associatively stores the transmission date and time "11/2/2007 12:00," the transmission destination "C Company," and the receivable document size "A4" in the reception-side receivable size memory area 74b, as shown in FIG. 6C.

Further, if an image data for an A4-size original document is subsequently transmitted to A Company on Nov. 2, 2007 at 18:00 and the maximum document size on the reception-side apparatus 200 at the destination (A Company) is changed to B4, then the information "11/1/2007 13:30," "A Company," and "A3" shown in FIG. 6B is replaced with the information "11/2/2007 18:00," "A Company," and "B4" shown in FIG. 6C.

Next, a fax transmission process executed by the CPU 11 of the MFP 71 according to the second embodiment will be described with reference to FIG. 7.

Figure 7:
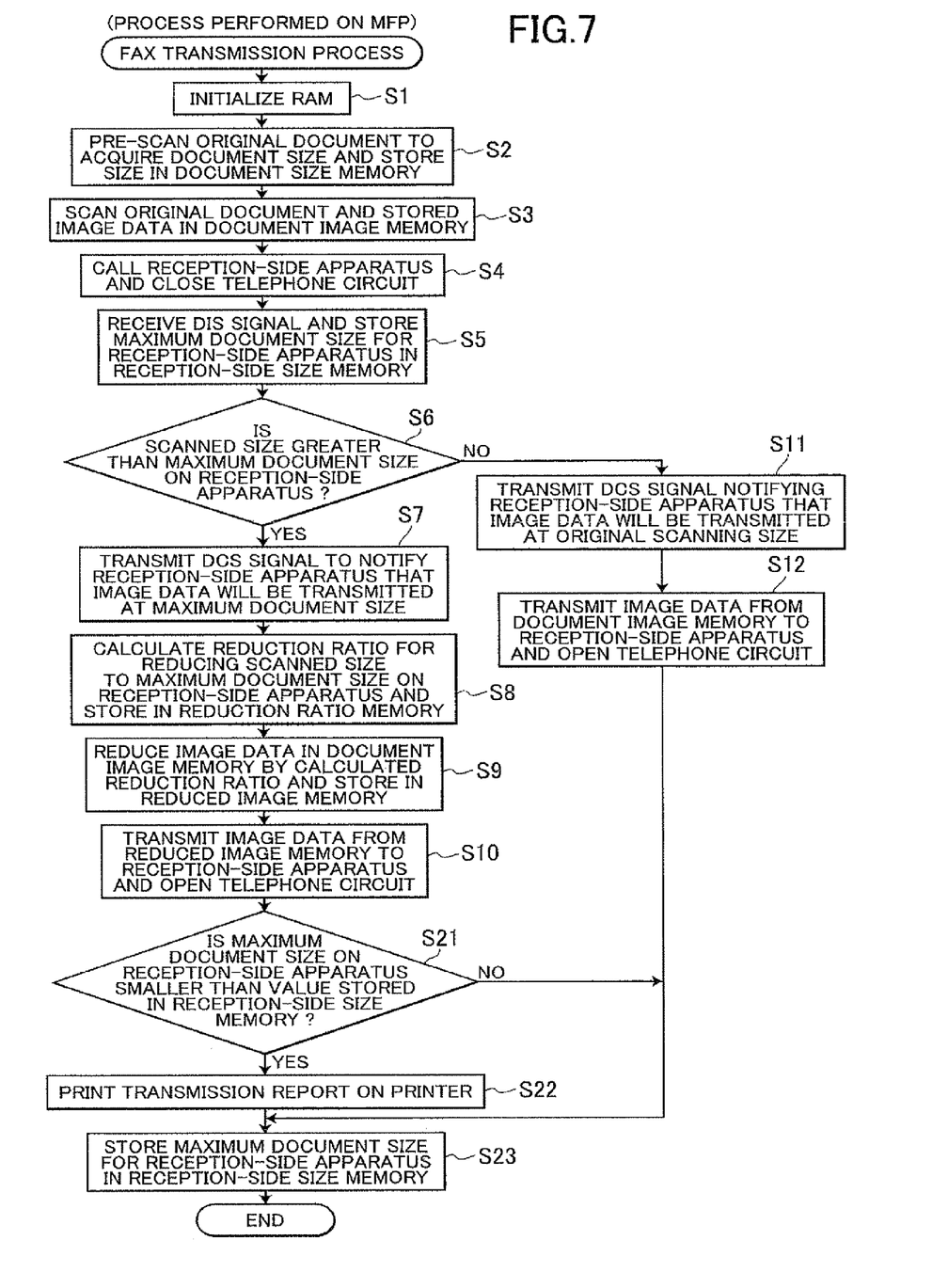
FIG. 7 is a flowchart illustrating steps in a fax transmission process performed on the multifunction peripheral according to the second embodiment.

FIG. 7 is a flowchart illustrating steps in the fax transmission process performed on the MFP 71 according to the second embodiment. In the flowchart shown in FIG. 7, steps identical to those in the flowchart of FIG. 4 are designated with the same step numbers to avoid duplicating description. Only the differing steps in FIG. 7 will be described below. A program implementing the main process in FIG. 7 is stored in the ROM 12.

The fax transmission process is performed to transmit an image scanned from an original document to the reception-side apparatus 200. In this process, the MFP 71 records a transmission report 60 (see FIG. 8) on recording paper with the inkjet printer 21 only when the maximum document size that can be received by the reception-side apparatus 200 is less than the maximum document size indicated in a previous transmission and when the original document image was reduced prior to the latest transmission.

The CPU 11 of the MFP 71 executes the fax transmission process when the user of the MFP 71 presses the fax transmission key 15a after selecting a transmission destination with the destination selection key 15b or after inputting a fax number on the number keys 15c to specify the transmission destination.

After completing the process in S10 described in the first embodiment, in S21 the CPU 11 determines whether the maximum document size indicated in the DIS signal received from the reception-side apparatus 200 at the transmission destination is smaller than the maximum document size for the reception-side apparatus 200 stored in the reception-side receivable size memory area 74b of the flash memory 74. In other words, the CPU 11 determines whether the maximum document size stored in the reception-side receivable size memory area 13c is smaller than the receivable page size for the reception-side apparatus 200 stored in the reception-side receivable size memory area 74b.

If the CPU 11 determines that the maximum document size in the reception-side receivable size memory area 13c is smaller than the maximum document size for the reception-side apparatus 200 stored in the reception-side receivable size memory area 74b (S21: YES), in S22 the CPU 11 controls the inkjet printer 21 to record the transmission report 60 described later on a recording paper.

However, if the maximum document size stored in the reception-side receivable size memory area 13c is the same as or greater than the maximum document size for the reception-side apparatus 200 stored in the reception-side receivable size memory area 74b (S21: NO), the CPU 11 skips S22 and advances to S23.

In S23 the CPU 11 associatively stores the transmission date and time at which the MFP 71 initiated the current transmission, the transmission destination at which the image data was received, and the maximum document size indicated in the DIS signal received from the reception-side apparatus

200 at the transmission destination in the reception-side receivable size memory area 74b, and subsequently ends the fax transmission process.

If a transmission date and time, transmission destination, and maximum document size at the destination are already associatively stored in the reception-side receivable size memory area 74b, in S23 the CPU 11 overwrites this existing data with the transmission date and time, destination, and maximum document size for the newly completed transmission.

Through the fax transmission process described in FIG. 7, the inkjet printer 21 is instructed to record the transmission report 60 (see FIG. 8) on recording paper only when the maximum document size for the reception-side apparatus 200 is less than the maximum document size in a previous transmission to the same reception-side apparatus 200 and when the CPU 11 reduced the image prior to the current transmission. Since the transmission results are recorded on recording paper only in cases where the transmission-side user would wish to confirm these results, less recording paper and ink are wasted unnecessarily in recording operations than in the conventional method of recording the transmission report 60 on recording paper each time an image is transmitted to the reception-side apparatus 200.

Further, this process ensures that the transmission-side user is notified by recording the transmission report 60 on recording paper only when there is a possibility that the transmitted image (image data) was compressed beyond readability or otherwise ruined. The present invention does not require the transmission-side user to confirm transmission results when such confirmation is unnecessary (when the image transmitted to the reception-side apparatus 200 was not reduced), thereby reducing the time and effort spent by the transmission-side user.

Next, the transmission report 60 will be described with reference to FIG. 8. The inkjet printer 21 records the transmission report 60 on recording paper when the maximum document size that can be received on the reception-side apparatus 200 is less than the maximum document size indicated for a previous transmission to the same reception-side apparatus 200 and when the CPU 11 reduced the original document image prior to the current transmission to the reception-side apparatus 200.

Figure 8:
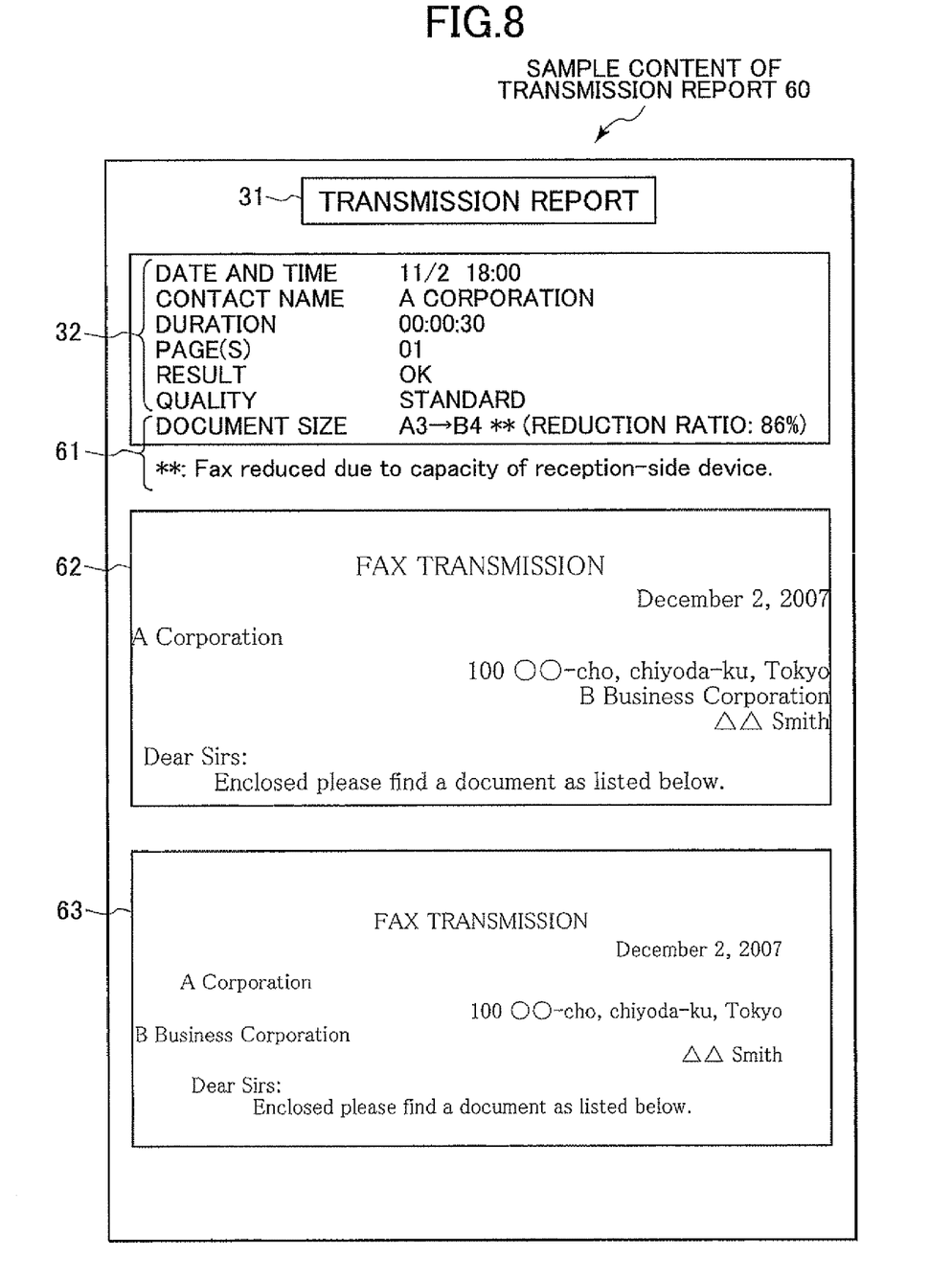
FIG. 8 is an explanatory diagram showing sample content in a transmission report according to the second embodiment.

FIG. 8 is an explanatory diagram showing sample content of the transmission report 60 recorded on recording paper, wherein like parts to the transmission report 30 described in FIG. 5 are designated with the same reference numerals to avoid duplicating description.

The single transmission report 60 is recorded on a single sheet of recording paper. In order from top to bottom in FIG. 8, the transmission report 60 includes the title 31, the transmission results information 32, a reduction results information 61, a scanned image 62, and a transmitted image 63. The title 31, transmission report 32, the reduction results information 61, the scanned image 62, and the transmitted image 63 correspond to a transmission result.

The reduction results information 61 indicates the results of reducing the image (the image data) prior to transmission to the reception-side apparatus 200. In this embodiment, the reduction results information 61 includes one document size of the document image scanned by the scanner 20, another document size of the image data transmitted to the reception-side apparatus 200, the reduction ratio used to reduce the original document size of the image scanned by the scanner 20 to the maximum document size on the reception-side apparatus 200, and supplemental information to the results of reducing and transmitting the data.

For example, when the size of the original document scanned by the scanner 20 is the A3 size and the reception-side apparatus 200 can receive a maximum document size of B4, the reduction results information 61 in the transmission report 60 includes the data "Document size: A3→B4 (reduction ratio: 86%)" and ": Fax reduced due to capacity of reception-side device."

The scanned image 62 is a portion of the original document image scanned by the scanner 20, i.e., part of the image corresponding to the image data stored in the document image memory area 13b of the RAM 13. The transmitted image 63 is a portion of the image corresponding to the image data transmitted to the reception-side apparatus 200, i.e., part of the image corresponding to image data stored in the reduced image memory area 13e of the RAM 13.

Since the reduction results information 61 of the transmission report 60 describes the size of the original document scanned by the scanner 20, the document size of image data transmitted to the reception-side apparatus 200, and the reduction ratio at which the original document scanned by the scanner 20 was reduced to the maximum document size that could be received by the reception-side apparatus 200 as described above, the transmission-side user can easily recognize how much the original document image was reduced before being transmitted to the reception-side apparatus 200.

Accordingly, if the reduced size of the image transmitted to the reception-side apparatus 200 is inappropriate, the transmission-side user can take steps to modify the image size on the original or the size of the original itself to an appropriate size, for example, and to retransmit the image.

Further, since the transmission report 60 also includes the scanned image 62 and transmitted image 63, the transmission-side user can easily recognize by looking at the transmitted image 63 whether the image transmitted to the reception-side apparatus 200 was reduced appropriately. The transmission-side user can even more easily recognize whether the image transmitted to the reception-side apparatus 200 was reduced appropriately by comparing the scanned image 62 and transmitted image 63.

Further, by recording the single transmission report 60 on a single sheet of recording paper, the transmission-side user can confirm the images (the scanned image 62 and transmitted image 63) associated with the transmission report 60 at a glance, unlike when the transmission report 60 is recorded on a plurality of sheets of recording paper or when a plurality of transmission reports 60 is recorded on a single sheet of recording paper. Further, by consolidating all necessary information on a single sheet of recording paper, this embodiment consumes less recording paper than when the information is recorded over a plurality of sheets.

While the invention has been described in detail with reference to specific embodiments thereof, it would be apparent to those skilled in the art that many modifications and variations may be made therein without departing from the spirit of the invention, the scope of which is defined by the attached claims.

For example, while the transmission report 30 is recorded on recording paper only when the image transmitted to the reception-side apparatus 200 was reduced prior to transmission in the first embodiment described above, it is also possible to record the transmission report 30 on recording paper in cases when the image was enlarged prior to transmission to the reception-side apparatus 200 in addition to or instead of cases in which the image was reduced prior to transmission. For example, if the size of the original document image scanned by the scanner 20 is smaller than the document size that can be received by the reception-side apparatus 200, the MFP 1 may enlarge the size of the original document image scanned by the scanner 20 to match a receivable (minimum) document size on the reception-side apparatus 200 prior to transmission. With this variation, the transmission report 30 is printed to notify the transmission-side user only when the original document image was enlarged or reduced prior to transmission. Accordingly, the transmission-side user can easily be informed when there is a high possibility that the transmitted image became fragmented when enlarged or was compressed beyond readability when reduced.

In the second embodiment described above, the transmission report 60 is recorded on paper when the maximum document size that can be received by the reception-side apparatus 200 is less than the maximum document size of an image previously transmitted to the reception-side apparatus 200 and when the image of the current transmission was reduced prior to transmission. However, the transmission report 60 may be recorded on paper for an image transmitted to the reception-side apparatus 200 only when the maximum document size that can be received by the reception-side apparatus 200 differs from that in a previous transmission (the maximum document size changed). In this way, the second embodiment can clearly notify the transmission-side user of a change in the maximum document size that can be received by the reception-side apparatus 200.

Further, the reduction results information 33 of the transmission report 30 (see FIG. 5) may be recorded on the recording paper in a color different from the title 31 and transmission results information 32. Similarly, the reduction results information 61 in the transmission report 60 (see FIG. 8) may be recorded on paper in a different color from the title 31, transmission results information 32, scanned image 62, and transmitted image 63. Using different colors in this way can aid the transmission-side user in more reliably recognizing the possibility that the transmitted image was compressed beyond readability.

Further, in addition to recording the transmission reports 30 and 60 on recording paper as described in the above embodiments, the MFP 1 may also display the content of the report on the LCD 16 or may transmit the content to the transmission-side user via e-mail, providing the transmission-side user with the convenience of confirming the transmission report 30 or 60 according to a preferred method.

Further, in the first embodiment described above, the transmission report 30 is recorded on recording paper only when the document image was reduced prior to transmission to the reception-side apparatus 200, while, in the second embodiment, the transmission report 60 is recorded on recording paper only when the maximum document size of the reception-side apparatus 200 is less than the maximum document size of an image previously transmitted to the same reception-side apparatus 200 and when the image of the current transmission was reduced prior to transmission. However, the MFP in these embodiments may be configured to record the transmission report 30 or transmission report 60 on paper also when the image could not be transmitted for any reason (when a transmission error occurred). In this case, the present invention notifies the transmission-side user of transmission results only when the user would wish to confirm these results.

Further, while the paper formats A3, A4, B4, and the like are used to indicate the document sizes in the above embodiments, it is also possible to use the actual dimensions of the paper or any symbols or numerals that can identify the document size. Similarly, the document sizes stored in the RAM 13 and flash memories 14 and 74 and recorded on the transmission reports 30 and 60 may be expressed in the actual dimensions of the paper or with the symbols or numerals that can identify the document sizes.

What is claimed is:

1. A facsimile apparatus comprising:
   a document size detecting unit that detects a first size of a first document;
   a first image data generating unit that generates first image data based on a first image on the first document;
   a size acquiring unit that acquires a second size of a second document that can be received by a reception-side apparatus;
   a size comparing unit that compares the first size with the second size;
   a second image data generating unit that generates second image data for forming a second image on the second document from the first image data based on a comparing result of the size comparing unit;
   an image data transmitting unit that transmits the second image data to the reception-side apparatus; and
   a first transmission result outputting unit that outputs exclusively a transmission result indicating a result of transmission of the second image data to the reception-side apparatus;
   wherein the second image data generating unit generates the second image data by reducing the first image data when the size comparing unit determines that the second size is smaller than the first size, and
   wherein the transmission result contains at least one of size information indicating the second size and ratio information indicating a ratio of the first size to the second size.

2. A facsimile apparatus comprising:
   a document size detecting unit that detects a first size of a first document;
   a first image data generating unit that generates first image data based on a first image on the first document;
   a size acquiring unit that acquires a second size of a second document that can be received by a reception-side apparatus;
   a size comparing unit that compares the first size with the second size;
   a second image data generating unit that generates second image data for forming a second image on the second document from the first image data based on a comparing result of the size comparing unit;
   a first storing unit that stores the second image data;
   an image data transmitting unit that transmits the second image data to the reception-side apparatus; and
   a first transmission result outputting unit that outputs exclusively a transmission result indicating a result of transmission of the second image data to the reception-side apparatus;
   wherein the second image data generating unit generates the second image data by reducing the first image data when the size comparing unit determines that the second size is smaller than the first size, and
   wherein the transmission result contains at least a part of the second image based on the second image data stored in the first storing unit.

3. The facsimile apparatus according to claim 2, further comprising:
   a second storing unit that stores the first image data; and
   a recording unit that records onto a recording medium the transmission result, wherein the transmission result contains at least the part of the second image and at least a part of the first image based on the first image data stored in the second storing unit; and wherein the recording unit records on a single sheet of recording medium the at least the part of the second image and the at least the part of the first image.

4. A facsimile apparatus comprising:

a document size detecting unit that detects a first size of a first document;

a first image data generating unit that generates first image data based on a first image on the first document;

a size acquiring unit that acquires a second size of a second document that can be received by a reception-side apparatus;

a first size comparing unit that compares the first size with the second size;

a second image data generating unit that generates second image data for forming a second image on the second document from the first image data based on a comparing result of the first size comparing unit;

an image data transmitting unit that transmits the second image data to the reception-side apparatus;

a first storing unit that stores identification data identifying the reception-side apparatus, and a third size of a third document that can be received by the reception-side apparatus, the third size being stored when previously transmitting an image data to the reception-side apparatus, the identification data being in association with the third size;

an identification data acquiring unit that acquires the identification data of the reception-side apparatus;

a second size comparing unit that compares the second size with the third size that is in association with the identification data acquired by the identification data acquiring unit and stored in the third storing unit; and a first transmission result outputting unit that outputs a transmission result indicating a result of transmission of the second image data to the reception-side apparatus only when the second comparing unit determines that the third size is different from the second size and the second image data is transmitted to the reception-side apparatus.

5. The facsimile apparatus according to claim 4, wherein the second image data generating unit generates the second image data by reducing the first image data when the first size comparing unit determines that the second size is smaller than the first size.

6. The facsimile apparatus according to claim 4, wherein the first transmission result outputting unit outputs the transmission result when the second comparing unit determines that the second size is smaller than the third size.

7. The facsimile apparatus according to claim 4, wherein the transmission result contains at least one of size information indicating the second size and ratio information indicating a ratio of the first size to the second size.

8. The facsimile apparatus according to claim 4, further comprising a second storing unit that stores the second image data, wherein the transmission result contains at least a part of a second image based on the second image data stored in the second storing unit.

9. The facsimile apparatus according to claim 7, further comprising:

a third storing unit that stores the first image data; and a recording unit that records onto a recording medium the transmission result, wherein the transmission result contains at least the part of the second image and at least a part of the first image to be formed based on the first image data stored in the second storing unit; and wherein the recording unit records on a single sheet of recording medium the at least the part of the second image and the at least the part of the first image.

* * * * *